(12) United States Patent
Burrington et al.

(10) Patent No.: US 9,027,422 B2
(45) Date of Patent: May 12, 2015

(54) METHOD AND SYSTEM OF MONITORING MASS IN A PULVERIZED COAL FIRED FURNACE

(75) Inventors: Richard L. Burrington, Westfield, MA (US); William K. Montuori, Simsbury, CT (US); William F. Rice, West Simsbury, CT (US); Thomas W. Sambor, Granby, MA (US); Lloyd E. Steen, Canton, CT (US)

(73) Assignee: ALSTOM Technology Ltd, Baden (CH)

( * ) Notice: Subject to any disclaimer, the term of this patent is extended or adjusted under 35 U.S.C. 154(b) by 1125 days.

(21) Appl. No.: 12/884,372

(22) Filed: Sep. 17, 2010

(65) Prior Publication Data

US 2011/0187545 A1    Aug. 4, 2011

Related U.S. Application Data

(60) Provisional application No. 61/300,265, filed on Feb. 1, 2010.

(51) Int. Cl.
*G01G 9/00* (2006.01)
*G06F 19/00* (2011.01)
*G08B 21/00* (2006.01)

(52) U.S. Cl.
CPC .................. *G01G 9/00* (2013.01); *G06F 19/00* (2013.01); *G08B 21/00* (2013.01)

(58) Field of Classification Search
USPC ............................................. 73/865
See application file for complete search history.

(56) References Cited

U.S. PATENT DOCUMENTS

| | | | |
|---|---|---|---|
| 3,124,770 A * | 3/1964 | Ciavatta ................... | 73/862.632 |
| 4,004,647 A | 1/1977 | Forst et al. | |
| 4,037,469 A | 7/1977 | Nordstrom et al. | |
| 4,408,568 A | 10/1983 | Wynnyckyj et al. | |
| 4,779,690 A | 10/1988 | Woodman | |
| 4,932,253 A * | 6/1990 | McCoy ...................... | 73/152.61 |
| 6,323,442 B1 | 11/2001 | Jones | |

* cited by examiner

*Primary Examiner* — Laura Martin
*Assistant Examiner* — Alex DeVito
(74) *Attorney, Agent, or Firm* — Robert D. Crawford

(57) ABSTRACT

A system 100 of monitoring mass in a furnace is described having a number of hanger rods 110 used to support at least a portion of the furnace. The system has at least one pressure sensor 111 that may be a load washer 111 operatively engaging a hanger rod 110 that provides a signal indicative of an amount of tension on the hanger rod 110. A pivoting unit 107, 109 distributes the force over the surface of the pressure sensor 111. A processor 200 monitors the signals from the pressure sensors 111 to set alarms when there is a mass overload, or adjust the operation of the furnace. The processor 200 may also predict when an overload will occur by extrapolating pressure sensor 111 readings forward into the future.

16 Claims, 2 Drawing Sheets

METHOD AND SYSTEM OF MONITORING MASS IN A PULVERIZED COAL FIRED FURNACE

CROSS REFERENCE TO RELATED APPLICATIONS

This application claims priority to U.S. provisional application entitled "Method And System Of Monitoring Mass In A Pulverized Coal Fired Furnace" having Ser. No. 61/300,265, filed Feb. 1, 2010, which is entirely incorporated herein by reference.

TECHNICAL FIELD

The present disclosure relates generally to pulverized coal fired furnaces, and more specifically, to a method and system of monitoring mass in a pulverized coal fired furnace.

BACKGROUND

During normal, recommended unit operation of a utility style steam generator, coal ash is continuously being created and continuously being removed from the bottom of the furnace. Unusual conditions may arise that can prevent continuous ash removal. During these conditions, ash may accumulate and increase the mass of the furnace. Since most furnaces are partially or wholly suspended from above, a large increase in mass can potentially create an overload condition that will rip seams, deform supports or structures, or result in tubing failure within the furnace.

Large ash clumps have been created and fallen down within furnaces causing damage to the furnace. Therefore, it is very desirable to monitor the rate of accumulation of ash and relative increase in suspended mass.

Traditional furnace support systems do not provide a means to let operators know if there is a change in suspended mass. Existing systems employ a visual method where the operator observes ash build-up in a furnace through an observation hole or an observation door. This is only useful where there is a direct line of sight from the observation point to the ash accumulation inside of the furnace.

Currently, there is a need for an accurate method of monitoring the accumulation of ash in a furnace.

SUMMARY

The present invention may be embodied as a mass sensor assembly 105 for monitoring mass in a pulverized coal fired furnace, the mass sensor 105 having a pressure sensor 111 operatively engaging a hanger rod 110 used to support at least a portion of the furnace; and a fastener 115 and pivoting unit 107, 109 that maintain the hanger 110 in operative engagement with the pressure sensor 111.

The present invention may also be embodied as a system 100 for monitoring mass in a pulverized coal fired furnace having a plurality of hanger rods 110 used to support at least a portion of the furnace, the system having at least one hanger rod 110 operatively engaging a pressure sensor 111 and providing a signal indicative of an amount of load on the hanger rod 111;

a fastener 115 and pivoting unit 107, 109 that maintain the hanger rod 110 is in operative engagement with the pressure sensor 111; and a processor 200 coupled to at least one of the pressure sensors 111 to receive their signals, calculate a mass measurement and provides an action in response to the calculated mass measurement.

The present invention may be embodied as a mass sensor assembly 105 for monitoring mass in a furnace hanging from hanger rods 110 supported by an upper surface of beams 11, 13, the mass sensor assembly 105 having a fastener 115 having a substantially planar lower surface attaching to an upper end of the hanger rod 110;

a pivoting unit 107, 109 for receiving the hanger rod 110, the pivoting unit 107, 109 being located between the fastener 115 and beams 11, 13, the pivoting unit having a top surface being parallel to a bottom surface of the fastener 115 so as to fit flush against the fastener 115 and a bottom surface being in a parallel plane with the top surface of the beams 11, 13 so as to fit flush against the beams 11, 13, the pivoting unit 107, 109 functioning to distribute force provided by the fastener 105 to its top surface through the pivoting unit 107,109 over the lower surface of pivoting unit 107, 109;

a pressure sensor 111 pressed flush between the bottom surface of the pivoting unit 107, 109 and the upper surface of the beams 11, 13 to receive force distributed to its top surface and to create a signal indicative of the force that it is receiving.

The above described and other features are exemplified by the following figures and detailed description.

BRIEF DESCRIPTION OF THE DRAWINGS

Referring now to the figures, which are exemplary embodiments, and wherein the like elements are numbered alike.

DETAILED DESCRIPTION

An increase in mass is an indication of undesired ash accumulation. Monitoring changes in furnace mass provides an advantage over not measuring changes at all. The present invention allows personnel to understand the operation of the furnace with more certainty allowing them to make informed decisions with respect to the operation of the furnace.

Since most of the mass of a furnace is constant, an increase in mass is usually due to the buildup of ash. The coal fuel is constantly being added to the furnace and is burned into gases, water vapor, flyash and bottom ash. The ash created typically falls to the bottom of the furnace and is removed. As stated above, the ash creates large clumps that stick to the walls or other structures of the furnace. This accumulation creates additional mass that can stress structures designed to support the furnace.

This problem is more pronounced in larger furnaces. The ash mass may conceivably reach 1700 metric tons. This can cause bending, tearing and breakage of structures within the furnace. Therefore, the mass must be monitored.

Since the mass of the furnace remains constant and most of the mass gain is due to the ash accumulation, monitoring the furnace and ash will indicate the buildup of ash.

Figure 1:
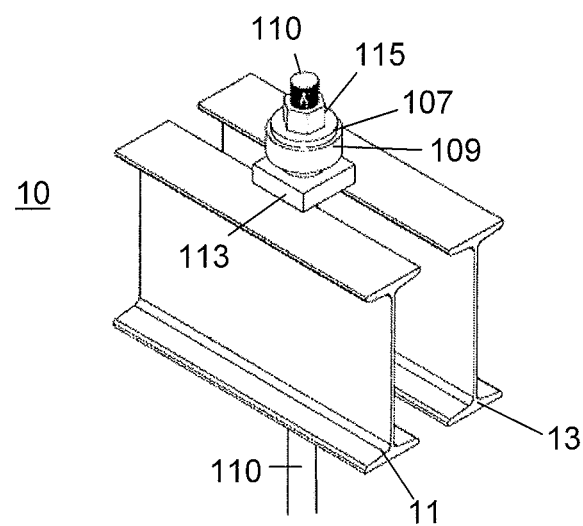
FIG. 1 is a perspective view of a support employing hanger rods to support a furnace, in accordance with the present invention.

FIG. 1 shows a conventional support 10 that employs hanger rods 110 that attach to the furnace and support the furnace from above. These hanger rods 110 are typically suspended from beams 11, 13. A fastener 115, washers 107 and 109, and a washer plate 113 suspend the hanger rod 110 from the beams 11, 13.

Figure 2:
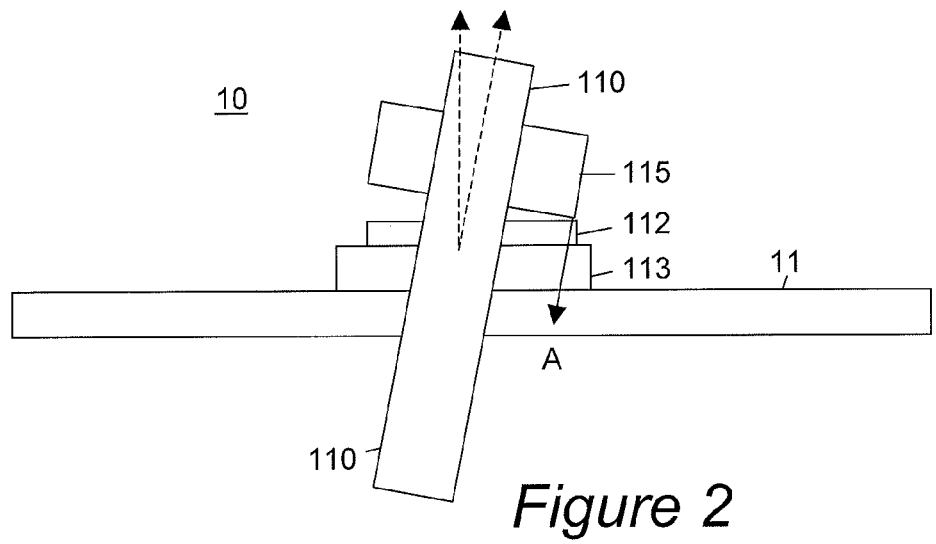
FIG. 2 is a cross sectional side elevational view of the support of FIG. 1.

FIG. 2 shows a cross sectional view of a conventional boiler support 10 employing a fastener 115, washer 112 and a washer plate 113. At times, hanger rods 110 may become slanted and be pulled by the furnace mass downward at an angle as shown. Since fastener 115 does not press equally on washer 112, there are locations of concentrated force. Here the force vector is shown as arrow "A".

Sometimes it is important to measure the force on each hanger rod 110. If washer 112 were replaced with a pressure sensor, such as a load washer (111 of FIG. 3) that monitors force applied to it and creates an electric signal indicating the force it is experiencing, it would give inaccurate readings since the force is unevenly distributed. Therefore, a device for distributing the mass experienced by the load washer 111 will be important.

Figure 3:
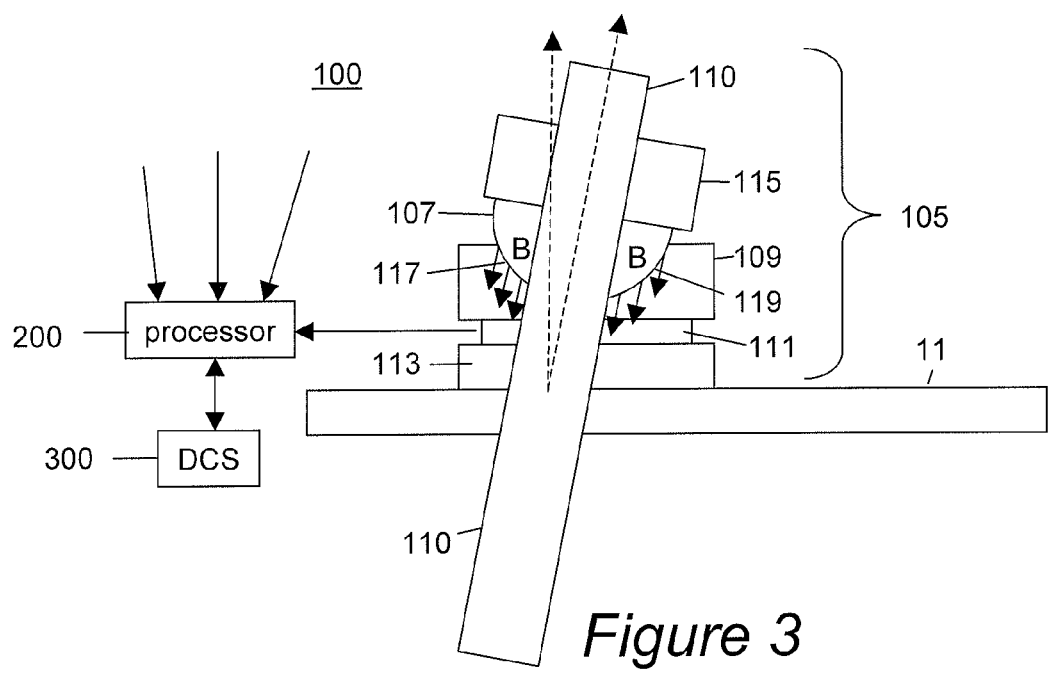
FIG. 3 is a cross sectional side elevational view of system 100 of monitoring mass according to one embodiment of the present invention.

FIG. 3 shows an elevational view of a mass sensor assembly 105 of the present invention 100. It employs a hanger rod 110 that supports the furnace and experiences a large force. A fastener 115 holds the end of the hanger rod 110.

A washer plate 113 fits flat on the upper surface of the beams 11, 13.

A load washer 111 rests flat on the upper surface of washer plate 113.

A spherical washer 107 has a through hole that receives the hangar rod 110. It also has a flat upper surface that fits flush against the fastener 115 (or intermediate washer), and a lower convex surface 117.

A cup 109 has a bottom surface that fits flush against the load washer 111 below it. Cup 109 has a concave upper surface 119 designed to receive the convex lower surface 117 of spherical washer 107 allowing spherical washer 107 to pivot about various axes with respect to cup 109. The spherical washer 107 and the cup 109 together may be referred to as a pivoting unit 107, 109. For small angular movements, such as those common to the motion of hanger rods 110, convex surface 117 will remain in contact with concave surface 119. This distributes the force through the spherical washer 107 and cup 109 along the surfaces as indicated by force vectors "B".

The function of the spherical washer 107 and cup 109 is to provide a true flat surface for load washer 111. This spherical washer 107 is capable of pivoting ±4° within cup 109 from the normal vertical axis while still transferring its full load evenly.

The load washer 111 creates an electrical signal related to the load it is experiencing. The load washer 111 is designed to be slightly deformed by the load of the hanger rods 110 and act as a strain sensor. The load washer 111 is designed to create an electrical signal proportional to the strain and deformation that it is experiencing. These are directly related to the force/mass that it is experiencing.

A number of load washers 111 are positioned in the upper boiler support system 10. In one embodiment, the load washers 111 are disposed on rows of hanger rods 110 along the front and rear wall support walls of the furnace.

Due to the number and proximity of the hanger rods 110 to one another in these rows, a select representative number of hanger rods 110 may be identified to be fitted with load washers 111. The front and rear walls are selected in this embodiment because the majority of the load is transmitted through these walls with the side walls conveying a minority of the total load.

In alternative embodiments, load washers 111 may be placed at various other locations.

Each load washer 111 is coupled to a processor 200 within a plant control system to receive the signals from the load washers 111 for processing of the received signals. In embodiments in which there is an interest in localizing the sensed mass, the processor 200 is made aware of the location of each load washer 111.

Signals received from the load washers 111 are used to determine a tare load. This setting is determined after the steam generator is erected, insulated and all appurtenances attached when the furnace is clean. As the load supported by a given hanger rod 110 increases it will be reflected in the signal from the appropriate load washer 111.

The signals from the load washers 111 are provided to a processor 200. The signals may be conditioned to filter out noise and otherwise remove extraneous interference signals from the signal received from the load washers 111, converted to and amplified to a signal recognizable be control systems.

In its simplest embodiment, processor 200 monitors the load and produces a signal representing the load. In another embodiment, processor 200 sets off an alarm when at least one of the load washers 111 experiences a load above a predetermined threshold.

In another embodiment, processor 200 is provided with the locations of the load washers 111. It also can differentiate between the input signals and identify which signals belong to which load washers 111. It may then determine which locations may be overloading and provide and indication of this overloading.

Since the processor 200 receives information over time, it can produce and store information to determine rates of mass increase. This may be used to predict situations in which there will be an overload based upon the current mass increase rate. This may also be monitored by location so that a specific location can be identified which will be overloaded at a future time based upon its mass gain.

Similarly, by monitoring the mass over space and time, one may be able to identify short-term localized signal spikes that indicate an impact at a given location by a large chunk of falling ash.

Another phenomenon that could be identified would be a shift of the ash within the furnace. This would show a loss of mass in one location while an adjacent location would be gaining more rapidly than the remaining locations.

The processor 200 may provide its output signal to a distributed control system (DCS) 300 that controls the operation of the furnace. The DCS 300 includes a display that will show the relative loads of each load washer 111 compared to the normal conditions. Alarm thresholds are developed to trigger alarms or other actions.

In an alternative embodiment, the DCS 300 uses the information from the processor 200 to modify operation of the furnace. For example, the furnace could reduce its operation to a lower level that does not accumulate ash as quickly. In another embodiment, the DCS 300 may also shut down the furnace if the mass within the furnace exceeds at predetermined value.

In an alternative embodiment, there is no processor 200. The signals from the load washers 111 are provided to the DCS 300. The DCS is modified to perform the functions that the processor 200 performed as described above.

By integrating load washers 111 in the furnace upper support system 10, a unique ability to monitor changes in the suspended mass of the furnace is presented. High capacity spherical washers are included to enhance the accuracy of the load washers by accommodating small angular movements of a hanger rod while maintaining flat mating surfaces between the washer plate, load washer, and lower half of the spherical washer. A unique graphic screen or set of screens will be employed to convey the information sensed by the load washers to the plant operators via control system displays. Further, the present invention contemplates that the strain signals from the load washers may control the operation of the furnace.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A mass sensor assembly for monitoring mass in a pulverized coal fired furnace; the mass sensor comprising:
    a spherical washer having a convex surface, the spherical washer operatively engaging a hanger rod used to support at least a portion of the furnace;
    a cup having flat surface and an opposing concave surface, the concave surface operatively engaging the convex surface of the spherical washer; and
    a load washer having opposing flat surfaces, one of the flat surfaces engaging the flat surface of the cup;
    wherein the hanger rod passes through a hole disposed in each of the spherical washer, the cup and load washer to compress the spherical washer, the cup and the load washer together whereby the load washer provides an electrical signal indicative of the compression force thereto.

2. A system for monitoring mass in a pulverized coal fired furnace having a plurality of hanger rods used to support at least a portion of the furnace, the system comprising:
    a plurality of pressure sensors, each of which operatively engages and provides a signal indicative of an amount of load on a respective hanger rod; wherein the pressure sensors include:
        a spherical washer having a convex surface, the spherical washer operatively engaging a hanger rod used to support at least a portion of the furnace;
        a cup having flat surface and an opposing concave surface operatively, the concave surface engaging the convex surface of the spherical washer; and
        a load washer having opposing flat surfaces, one of the flat surfaces engaging the flat surface of the cup;
        wherein the hanger rod passes through a hole disposed in each of the spherical washer, the cup and load washer to compress the spherical washer, the cup and load washer together whereby the load washer provides an electrical signal indicative of the compression force thereto; and
    a processor coupled to each of the pressure sensors to receive their signals, processing each signal to calculate a mass measurement for each sensor.

3. The system of claim 2, wherein the processor receives the signals and conditions them for calculating a mass of material within the furnace.

4. The system of claim 2 wherein the processor is adapted to indicate when the mass measurement exceeds a predetermined threshold.

5. The system of claim 4 wherein the processor is further adapted to:
    set off an alarm when the mass measurement from the processor exceeds a predetermined threshold.

6. The system of claim 2 wherein the processor is further adapted to:
    receive information as to where the sensors are located;
    identify which pressure sensor is paired to each signal; and
    determine mass loading at a selected pressure sensor location by analyzing the signal from the pressure sensor at the selected location.

7. The system of claim 6 wherein the processor is further adapted to:
    monitor sensor signals over time to indicate mass over time; and
    identify changes in mass over time to identify shifting of accumulated ash within the furnace.

8. The system of claim 5 wherein the processor is further adapted to:
    monitor signals from pressure sensors over time to indicate mass over time; and
    identify large changes of mass over short period of time indicating an impact of ash falling within the furnace.

9. The system of claim 8 wherein the processor is further adapted to:
    identify a pressure sensor having the maximum signal when a large mass change over a short time period indicating an impact near the sensor location having the maximum signal.

10. The system of claim 8 wherein the processor is further adapted to:
    monitor at least one pressure sensor over time to indicate a trend regarding the mass of the ash, and
    identify the trend to an operator.

11. The system of claim 8 wherein the processor is further adapted to:
    monitor at least one pressure sensor over time to indicate a trend regarding the mass of the ash and extrapolate to indicate when the mass will exceed a predetermined threshold; and
    indicate when the mass will exceed the predetermined threshold to an operator.

12. The system of claim 11 further comprising:
    a distributed control system (DCS) coupled to the processor that is adapted to adjust boiler operation parameters when the mass calculated by processor exceeds a predetermined threshold.

13. The system of claim 11 further comprising:
    a distributed control system (DCS) coupled to the processor that is adapted to shut down operation of the furnace when the mass calculated by processor exceeds a predetermined threshold.

14. The system of claim 2, wherein the spherical washer is capable of pivoting +/−4 degrees within the cup.

15. The mass sensor assembly of claim 1, wherein the spherical washer is capable of pivoting +/−4 degrees within the cup.

16. A system for monitoring mass in a pulverized coal fired furnace having a plurality of hanger rods used to support at least a portion of the furnace, the system comprising:
    a plurality of pressure sensors, each of which operatively engaging and providing a signal indicative of an amount of load on the respective hanger rod; and
    a processor coupled to each of the pressure sensors to receive their signals, processing each signal to calculate a mass measurement for each sensor, wherein the processor is further adapted to:
    monitor sensor signals over time to indicate mass over time; and identify changes in mass over time to identify shifting of accumulated ash within the furnace.

\* \* \* \* \*